*INVENTOR.*
HOWARD NOYES

ATT'Y.

United States Patent Office 2,763,586
Patented Sept. 18, 1956

2,763,586

COMPOSITE SHEET MATERIAL

Howard Noyes, Dayton, Ohio, assignor to The Dayton Rubber Company, a corporation of Ohio Application December 23, 1952, Serial No. 327,517

9 Claims. (Cl. 154—53)

The present invention relates to laminated structural materials, particularly to composite sheet materials of laminae of rubber-like compositions or resinous materials and foraminous metal employing a corrugated reinforcing member integrally associated therewith.

In my copending applications No. 298,318, filed July 11, 1952, and No. 301,869, filed July 31, 1952, I have provided a laminated metal reinforced structural material. This application relates to the combination of a flat sheet and a corrugated sheet of various types of such material. My invention also relates to methods for the manufacture of this novel material.

The need for an impervious, corrosion-resistant material of sufficient strength to meet the demands of industrial design is widely recognized. Not only must this material be strong in tension, in compression and in shear, but also it must have a high modulus of elasticity and a rigidity that will enable it to maintain a given shape when subjected to stress. In the past, the demand for such material has been fulfilled by the use of the various metals such as steel, aluminum and the like. In the use of these metals, however, there has been a calculated sacrifice of impervious and corrosion-resistant properties in order to gain the necessary structural strength and rigidity.

It is true that stainless steel has the necessary structural strength together with certain corrosion-resistant properties, but its use has been restricted by its high cost and scarcity. Corrosion resistance has also been achieved in the past by the coating or plating of the structurally strong metals with weaker but more corrosion-resistant metals such as zinc, chromium and the like. Once again the cost of the material and labor involved in the plating process restricts the use of such coated metals as does the relative scarcity of the coating materials. At the same time the corrosion-resistant coating tends to crack and break off where the surface is subjected to nominal distortion such as might occur from handling, temperature changes and the like with the subsequent loss of corrosion resistance and premature deterioration of the structural material.

Rubber and rubber-like compositions have a recognized excellence in imperviousness and corrosion resistance, but lack the necessary strength to lend themselves to structural applications in which they must perform strengthening functions. In my aforementioned copending applications, however, I have proposed various means for so reinforcing rubber and rubber-like compositions as to impart the necessary strength and rigidity to enable their use as a structural material. In the present application I propose to provide still another type of rubber sheeting having even greater strength and rigidity.

Accordingly, it is an object of my invention to provide a reinforced rubber material of great strength and rigidity.

It is a further object of my invention to provide such a material that will be less expensive than the known structural materials having the same strength and rigidity.

It is still a further object of my invention to provide methods for the manufacture of such a material.

Briefly summarized, my invention embodies the application of a corrugated sheet of metal and rubber material to a flat sheet of a similar composite material so as to form a strong and rigid integrated sheet material. The corrugated member may comprise a foraminous metal reinforcement, coated with a rubber composition so that the interstices of said reinforcing portion are filled with the rubber or so that the rubber merely coats the metallic portion leaving the interstices therein open. As will be more fully explained below, the corrugations of the corrugated member of my material may lie at various angles to the metallic strips of the foraminous reinforcing portion of the corrugated member, and the corrugated member may in turn be applied to the flat member of my material so that the corrugations lie at various angles to the metallic strips of the foraminous reinforcing portion of the flat member. By thus varying the axis of the corrugations relative to the pattern of the respective foraminous metal layers, I obtain varying strength characteristics and provide a material adaptable to a wide range of structural applications.

It is important that the corrugated layer of my sheet material be integrally connected to the flat layer thereof so as to increase the effective thickness of the composite sheet. Because the effective thickness is thus increased, the static inertia of the material is enhanced and the material offers greater resistance to flexing and bending. At the same time, the corrugated reinforcing member imparts greater tensile, compressive, and shear strength to the composite material.

Having thus briefly described my invention, I shall now proceed with a detailed description thereof for which reference may be had to the appended drawings.

Figure 1:
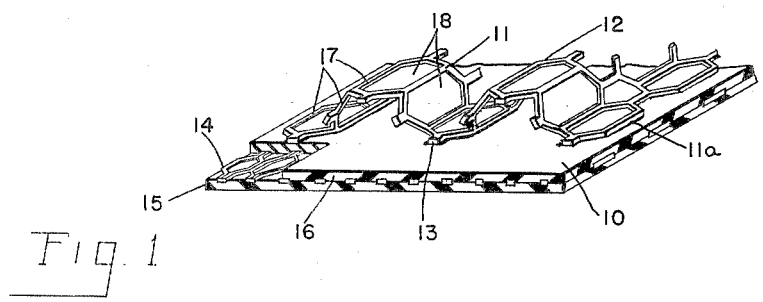
Figure 1 is a view in perspective, partially cut away and vertically sectioned, of a typical form of the material of my invention.

As best shown in Figure 1, a typical material of my invention comprises a base of surface member 10 to which is adhered a corrugated or undulating reinforcement member 11. In the example shown, the base layer 10 is generally planar, while the reinforcement layer 11 constitutes a series of alternately spaced crests 12 and troughs 13 to form a uniformly undulating pattern. Since my present invention relates to a structural material, it is to be understood that the material need not be planar as in the example of Figure 1, but may take a variety of shapes and configurations in which the reinforcement member 11 will follow the course of the surface member 10 and remain integrally connected thereto at the surface of the troughs 13 engaging the upper surface of the base member 10.

The base member itself is composed of a metal reinforced rubber or resinous substance, wherein the metal reinforcement is foraminated. The example of Figure 1 shows the base member 10 to consist of a core of flattened metal lath 14 interposed between coating layers 15 and 16 of a rubber or synthetic composition. The reinforcement portion 11, which is integrally associated with the base member 10 by vulcanization or by the use of a suitable adhesive 11a, consists solely of a corrugated sheet of metal lath which forms an undulating lattice pattern of metal strips 17 which define uniformly elongated hexagonal interstices 18. The direction in which these interstices are so elongated, I shall henceforth refer to as the major axis of the interstices. With respect to the spaced crests 12 and troughs 13, it will be observed that they too form a uniform pattern. The direction in which these undulations extend, I shall henceforth designate as the corrugation axis.

I have found that the foraminous metal portions of my material will have varying strength and bending characteristics according to the nature and shape of the foraminations. Specifically I have found that the foraminous metal has an inherent rigidity in the direction of the major axis of its interstices. Similarly, a corrugated sheet of metal will have an inherent rigidity in the direction of its corrugation axis. It is the utilization of the inherent strength characteristics of these layers which provides a variety of strength properties in the composite material of my invention.

Considering first the reinforcement member 11 only, I may align the major axis of its interstices with its corrugation axis, thereby achieving a high rigidity in the direction of these axes. At the same time, the rigidity of the material in the direction transverse these axes will be relatively unaffected. On the other hand, I may place the corrugation axis at right angles to the major axis of the interstices so as to impart a rigidity to the material in all directions. This latter arrangement obviously imparts the most uniform rigidity to the material, though the rigidity in any one direction will not be as great as it would if the elongation and corrugation axes were aligned as shown in Figure 1.

Figure 3:
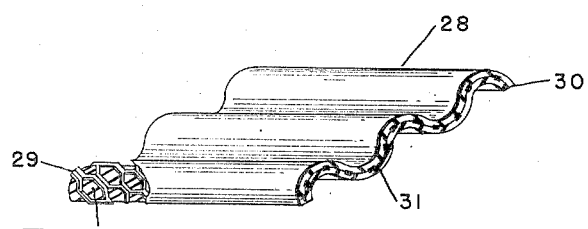
Figure 3 is a partially cut away perspective of the corrugated member of the material of my invention involving a modified construction.

In a similar manner, any number of rigidity characteristics may be obtained by varying the angle at which the corrugation axis intersects the major axis of the interstices and for any particular angle of intersection, the added rigidity in the direction of the axis of the interstices imparted by the corrugations will bear the same relation to the rigidity imparted transverse such axis as the cosine of the intersection angle bears to the sine thereof. In Figure 3, I have shown a corrugated reinforcing member 28 composed of a corrugated sheet of metal lath 29 imbedded between layers 30 and 31 of a rubber or rubber-like composition in which the metallic strips form hexagonal interstices 32 which are uniformly elongated in a direction at 45 degrees to the corrugation axis. The angle of intersection of corrugation and major interstitial axes being 45 degrees, and the sine of 45 degrees being equal to the cosine thereof, the reinforcing effect of the elongated interstices in the direction of the corrugations will equal their reinforcing effect perpendicularly thereto.

Thus far the corrugated reinforcement members of my material have been considered separately. In the same manner that the rigidity characteristics of these members may be changed by varying the angle of their corrugation axis to the major interstitial axis of their metallic portions, so may the rigidity characteristics of the composite material be changed by varying the application of the surface or base member to the reinforcement layer so that the major interstitial axis of the metal portion of the surface member forms different angles with the major interstitial and/or corrugation axis of the reinforcement member. Referring again to Figure 1, it will be observed that the major axis of the interstices of the metallic portion 14 of the base or surface layer 10 is parallel to that of the metallic reinforcing member 11 which is in turn parallel to the corrugation axis of the corrugated reinforcing member 11. Since all of these strengthening factors are acting in the same direction, their effect is arithmetically additive, and the material shown will be quite rigid in that direction.

Figure 2:
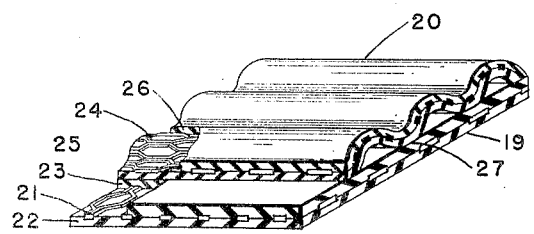
Figure 2 is perspective also partially cut away and vertically sectioned of an alternative material embodying the principles of this invention.

In the modification of my invention shown in Figure 2, the base portion 19 is composed of a sheet of metal lath 21 between layers 22 and 23 of rubber or rubber-like composition. The corrugated reinforcing member 20 consists of a sheet of similar foraminous metal 24 which is itself coated on each side with rubber or rubber-like layers 25 and 26. In this construction, the corrugation axis and the major axis of the interstices of the reinforcing member 20 are parallel, but the base member 19 is so adhered thereto, that the major axis of the interstices of the metal layer 21 is at right angles to the aforementioned parallel axes. While the material thus constructed will not have as great a rigidity in any one direction as will that illustrated in Figure 1, the rigidity of the material taken as a whole will be more nearly the same in all directions, thereby rendering it more desirable for certain applications.

The foraminous metal to be used in the material of this invention may be in the form of any of the well known flattened or unflattened expanded metals, wire laths, hardware cloths, wire mesh and the like. The inherent characteristics of the type and proportions of metal used will of course affect the bending qualities of the composite material as will the properties of the rubber or resinous composition employed. I have found that a satisfactory material in these respects may be composed of a rubber composition of substantially the following parts by weight:

100 parts butadiene-acrylic nitrile copolymer
2 parts sulfur
5 parts carbon black
15 parts zinc oxide
1.5 parts accelerator
150 parts clay
31 parts resinous reinforcer
15 parts phosphate type plasticizer This compound is capable of curing for 30 minutes at 290° Fahrenheit to a Shore A durometer hardness of from 90 to 95. When such a composition is combined with a low carbon steel lath weighing 3.4 pounds per square yard according to this invention, the composite will have the desired rigidity and durability.

The interstices within the foraminous metal provide a savings in metal requirements for the reinforcement of a given area. Savings in rubber requirements are made possible by this invention in the following particulars. First, since the surface layer 10 is to be completely coated and filled with a rubber composition, I employ a flattened metal lath of the type shown in Figure 1 for its metal portion 14. This flattened material is relatively thin so that the volume within the interstices is reduced and less rubber is required to fill the same. Because the basic strength of my material will rest in the reinforcement member 11, the surface member 10 may be designed to function basically as an imperviousness imparting element. Accordingly, the metal portion 14 may be of as light a gauge as is consistent with a good bond between the metal 14 and rubber layers 15 and 16. Since the flattened metal has less tendency to cut or tear through the rubber material than does the unflattened metal, the necessary bonding properties may be obtained by the use of a still lighter gauge of the flattened metal with a greater reduction in rubber required to impart imperviousness.

Since the desired imperviousness is provided by the surface layer 10 of my material, the interstices of the metal in the reinforcing member may be left open and just enough rubber applied to the metal strips to make them corrosion resistant and to allow for adhesion to the surface member 10 as will be hereinafter described. Thus a further savings in rubber and reduction in cost is provided for in my material. Where the application of this material involves the necessity for only one corrosive resistant surface, the corrugated member may be left entirely exposed as shown in Figure 1, so that a still greater savings in rubber is effected.

In the fabrication of the material of the present invention, I may form the base member 10 and/or the reinforcement member 11 according to the methods outlined in my aforementioned copending applications. The reinforcement member is then corrugated in any well known manner such as in a corrugating press. Once corrugated, the reinforcement member is adhered to the surface member along the troughs of the corrugations as shown at 27. Rubber cement or similar adhesive means may be used for so connecting the respective members of my material.

In keeping with the methods of my copending applications numbered 298,318 and 301,869, the members of my material may be composed of unvulcanized or partially vulcanized rubber and said members may then be joined by a vulcanizable cement, so that after the material has been given its desired configuration, the final assembly may be vulcanized to integrally unite the members of the material and the components of the finished article. The type of adhesive used should of course depend upon the use to which the object formed from the material will be put. For example, where a fuel container is involved, a fuel resistant adhesive such as a solution or emulsion of polychloroprene or butadiene-acrylonitrile copolymer should be employed. Where both the base member and the reinforcement member have rubber-like surfaces at points where they are to be joined, a vulcanizable rubber cement such as the above enumerated should be applied to the surfaces prior to vulcanization and integration of the separate members. Where, as shown in Figure 1, one of the members has no rubber surface or where the rubber surfaces to be joined have been previously vulcanized, a solvent released adhesive material may be used.

An equally satisfactory process for the manufacture of my material, and one involving the greatest savings in material and reduction in cost, comprises pressing a surface layer of rubber-like material into the interstices of a sheet of flattened metal lath so as to leave a coating on at least one surface of said metal lath; of placing thereon a corrugated sheet of metal lath and cementing the same to the rubberized metal sheet by means of a vulcanizing cement along the troughs of the corrugations; of spraying or immersing the sheet in a rubber solution so as to coat all of the exposed metal surfaces including those of the corrugated member; and finally subjecting the whole thus formed to the vulcanizing heat and pressure of open steam.

In the methods above described, the corrugations may be formed and the metal portions positioned in such a manner that the elongation and corrugation axes are so arranged as to give the desired strength and rigidity characteristics as previously described.

The uses for which the material of this invention, because of its structural strength, unusual corrosion resistance and imperviousness, is particularly adapted, include outdoor fluid storage tanks, automotive and aeronautical fuel cells, utility liquid containers, industrial trays, food storage containers and compartments, roofing, flooring, laboratory and factory wall paneling and the like.

Although I have referred to specific and detailed embodiments of my invention, it is to be understood that such references were for descriptive purposes only and do not limit the scope of my invention as defined by the subjoined claims.

I claim:

1. As an article of manufacture a composite sheet material comprising a flat foraminous metal surface layer, a corrugated foraminous metal reinforcing layer, each of said layers having uniformly elongated interstices the major axes of which as to one layer are parallel to the major axes as to the other layer and a rubber coating upon at least one surface and filling the interstices of at least one of said layers.

2. A composite sheet material according to claim 1 wherein said surface layer is of a flattened expanded metal.

3. A material according to claim 1 wherein the corrugation axis is parallel to the major axes of the interstices.

4. A material according to claim 1 wherein the corrupation axis is angularly disposed to the major axes of the interstices.

5. As an article of manufacture a composite sheet material comprising a flat foraminous metal surface layer, a corrugated foraminous metal reinforcing layer, each of said layers having uniformly elongated interstices the major axes of which as to one layer are angularly disposed to the major axes as to the other layer and a rubber coating upon at least one surface and filling the interstices of at least one of said layers.

6. A composite sheet material according to claim 2 wherein said surface layer is of a flattened expanded metal.

7. A material according to claim 2 wherein the corrugation axis is parallel with one of the major axes of the interstices.

8. A material according to claim 2 wherein the corrugation axis is angularly disposed to each of the major axes of the interstices.

9. A material according to claim 8 wherein said corrugation axis bisects the angle formed by said major axes of the interstices.

References Cited in the file of this patent

UNITED STATES PATENTS

| | | |
|---|---|---|
| 239,159 | Gaussen | Mar. 22, 1881 |
| 1,505,272 | Mart | Aug. 19, 1924 |
| 1,637,410 | Coryell | Aug. 2, 1927 |
| 2,094,041 | Lee et al. | Sept. 28, 1937 |
| 2,345,844 | Weiss | Apr. 4, 1944 |
| 2,619,363 | Wenham et al. | Nov. 25, 1952 |
| 2,621,528 | Luaces et al. | Dec. 16, 1952 |